US008834971B2

(12) United States Patent
Omeis et al.

(10) Patent No.: US 8,834,971 B2
(45) Date of Patent: Sep. 16, 2014

(54) PROCESS FOR CONTINUOUS PREPARATION OF A PREPOLYMER BASED ON PHENOLIC RESINS, OXAZOLINES AND EPOXIDES

(75) Inventors: Marianne Omeis, Dorsten (DE); Franz-Albert von Itter, Alfter (DE); Thomas Weihrauch, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 392 days.

(21) Appl. No.: 13/297,906

(22) Filed: Nov. 16, 2011

(65) Prior Publication Data
US 2012/0121812 A1 May 17, 2012

(30) Foreign Application Priority Data

Nov. 17, 2010 (DE) .......................... 10 2010 044 050

(51) Int. Cl.
B05D 3/02 (2006.01)
B29C 47/10 (2006.01)
C08G 59/00 (2006.01)
C08G 59/18 (2006.01)
C08G 59/68 (2006.01)
C08K 7/14 (2006.01)
C08G 59/62 (2006.01)
C08L 63/00 (2006.01)
C08G 59/50 (2006.01)
C08G 73/02 (2006.01)
C08G 59/02 (2006.01)
C08L 61/04 (2006.01)
B32B 27/04 (2006.01)

(52) U.S. Cl.
CPC . C08L 61/04 (2013.01); C08K 7/14 (2013.01); C08G 59/621 (2013.01); C08J 161/06 (2013.01); C08G 59/687 (2013.01); C08L 63/00 (2013.01); C08G 59/504 (2013.01); C08G 73/0233 (2013.01); C08G 59/022 (2013.01)
USPC .................. 427/389.8; 264/211; 264/211.21; 264/211.23; 264/211.24; 427/385.5; 427/389.7; 428/297.4; 528/106; 528/116; 528/119

(58) Field of Classification Search
None
See application file for complete search history.

(56) References Cited

U.S. PATENT DOCUMENTS

| 4,413,096 A | 11/1983 | Fu et al. |
| 4,652,620 A | 3/1987 | Tufts et al. |
| 4,806,267 A | 2/1989 | Culbertson et al. |
| 5,378,769 A | 1/1995 | Mugge et al. |
| 5,962,683 A | 10/1999 | Steinmann et al. |
| 6,372,862 B1 | 4/2002 | Ozeki |
| 8,445,566 B2 * | 5/2013 | Omeis et al. ..................... 524/96 |
| 2008/0119594 A1 | 5/2008 | Asbahr et al. |
| 2011/0207861 A1* | 8/2011 | Omeis et al. ................. 524/100 |

FOREIGN PATENT DOCUMENTS

| CA | 1 169 061 A | 6/1984 |
| DE | 10 2008 001 470 A1 | 11/2009 |
| EP | 0 063 544 A1 | 10/1982 |
| EP | 0 230 653 A2 | 8/1987 |
| EP | 0 816 346 A1 | 1/1998 |
| EP | 1 085 071 A2 | 3/2001 |
| EP | 1 085 071 A3 | 3/2001 |
| EP | 1 548 012 | 6/2005 |
| GB | 1 369 129 | 10/1974 |
| JP | 57-180616 A | 11/1982 |
| JP | 62-230824 A | 10/1987 |
| JP | 05222166 A * | 8/1993 ............ C08G 59/62 |
| JP | 05-279566 A | 10/1993 |
| JP | 07-025991 A | 1/1995 |
| JP | 1995-025991 A | 1/1995 |
| JP | 10-114760 A | 5/1998 |
| JP | 2004-211072 A | 7/2004 |
| JP | 2004-535504 A | 11/2004 |
| WO | WO 94/14867 A1 | 7/1994 |

OTHER PUBLICATIONS

Machine translation of JP 05222166 A, provided by the JPO website (no date).*
Japanese Office Action issued Nov. 25, 2013 in Patent Application No. 2009-218908 (English Translation only).
Combined Taiwanese Office Action and Search Report issued Nov. 8, 2013 in Patent Application No. 098131616 (English Translation only).
Chinese Office Action issued Nov. 8, 2013 in Patent Application No. 200910173284.3 (English Translation only).
U.S. Appl. No. 13/926,267, filed Jun. 25, 2013, Rinker et al.
Office Action issued Sep. 2, 2013, in Japanese Patent Application No. 2011-506640 (German-language translation only).
European Search Report issued Jan. 4, 2012, in Patent Application No. 11186876.6 (with English Translation of Category of Cited Documents).
Office Action issued Sep. 2, 2013 in Japanese Patent Application No. 2011-506640 (previously filed Oct. 28, 2013, submitting English translation only).
Office Action issued Sep. 17, 2013 in Japanese Patent Application No. 2011-506639 (submitting English translation only).

* cited by examiner

Primary Examiner — Michael J Feely
(74) Attorney, Agent, or Firm — Oblon, Spivak, McClelland, Maier & Neustadt, L.L.P.

(57) ABSTRACT

Process for the continuous preparation of prepolymers based on phenolic resin, an oxazoline component and an epoxide in the presence of a catalyst, including supplying the phenolic resin and the oxazoline component to an extruder in a stream A; a Lewis adduct of boron trifluoride or of aluminum trichloride, or arylsulphonic acids or alkylsulphonic acids, or latent arylsulphonic acids or latent alkylsulphonic acids, in a stream B, and the epoxide in a stream C, the infeed of stream A being situated, as seen in extrusion direction, before the infeed of stream C, these reactants are mixed at a reaction temperature of 120 to 200° C. with a residence time in the extruder of 3 seconds to 15 minutes, and then the product discharge of the extruder is cooled to a temperature of less than 45° C. within from 30 to 60 seconds.

16 Claims, 1 Drawing Sheet

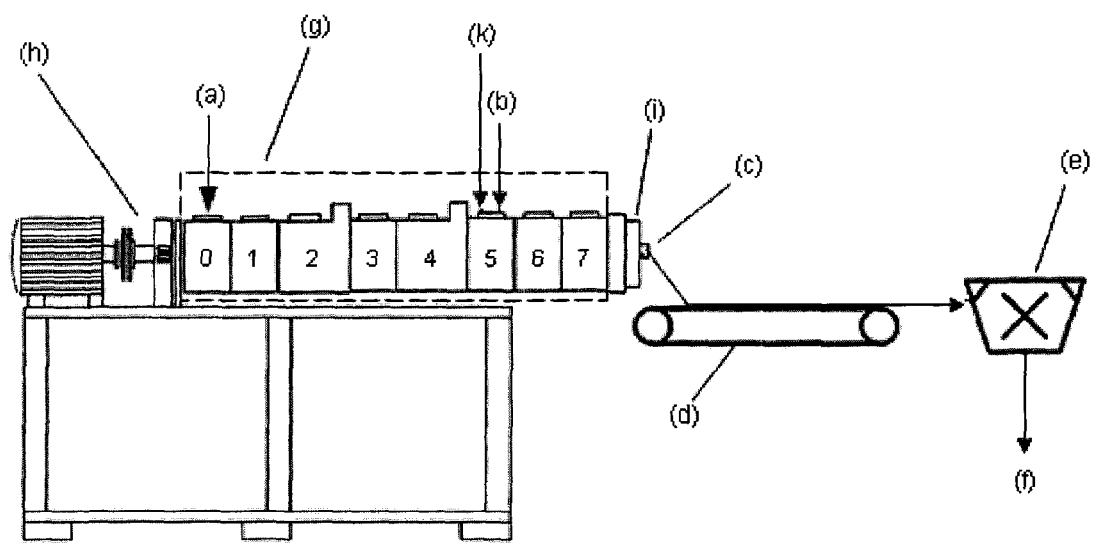

PROCESS FOR CONTINUOUS PREPARATION OF A PREPOLYMER BASED ON PHENOLIC RESINS, OXAZOLINES AND EPOXIDES

BACKGROUND OF THE INVENTION

1. Field of the Invention

The present invention describes a continuous process for the preparation of a prepolymer based on oxazolines, epoxides and phenolic resins, using a catalyst, and also the use thereof.

2. Discussion of the Background

E. A. Boulter et al. in Electrical Insulation Conference, 1997, and Electrical Manufacturing & Coil Winding Conference Proceedings, Volumes 22-25 (September 1997), pages 249-253, describe the properties of oxazoline-modified phenolic resins, such as, for example, the adhesion to carbon fibres, glass fibres and metals, the resistance to thermooxidative degradation, the low level of smoke given off in the event of fire, the low flammability and the high impact strength. On account of the low flammability in particular these polymers are suitable for producing components for the aircraft industry. Further applications lie in the sector of electrical insulation and in the electronics sector. According to E. A. Boulter, these precursors and prepolymers are also suitable for applications including injection moulding, resin transfer moulding (RTM) and prepregs.

The reaction of difunctional oxazolines with phenolic resins is described in the literature. U.S. Pat. No. 4,699,970, for instance, describes the reaction of phenolic resins with 1,3-phenylenebisoxazoline in the presence of catalytic amounts of triphenyl phosphite. According to the examples, curing is carried out at a temperature of 225° C. The polymers obtained have a glass transition temperature of 138 to 184° C.

U.S. Pat. No. 5,302,687 likewise describes the reaction of 1,3-phenylenebisoxazoline with phenolic resin in the presence of phosphonium salts and/or ammonium salts. Here again, curing takes place, according to the examples, at 225° C., and again polymers are obtained that have a glass transition temperature of 150 to 157° C.

WO 2009/132924 describes a polymer composition comprising phenolic resin that comprises oxazolines and a stabilizer. Catalysts used are trialkyl or triaryl phosphites. This polymer composition is prepared preferably by means of an extruder.

WO 2009/053581 describes a resin composition composed of an epoxy resin and a plasticizer, the plasticizer having the function of dissolving the epoxy resin and influencing the viscosity. This resin composition may further be admixed with crosslinkers, such as 1,3-phenylenebisoxazolines, for example. Catalysts cited include Lewis bases and Lewis acids, such as boron trifluoride-monoethylamine, for example. The composition can be prepared by simple mixing. The curing temperature is not more than 195° C.

Hajime Kimura et al. in Journal of Applied Polymer Science, Vol. 107, 710-718 (2008) describe the preparation of a resin composition composed of bisoxazolines and benzoxazines, using a mixture of a sulphonic acid and an amino alcohol or alkylamine as catalyst (latent sulphonic acid). The resin is prepared by a batch process. The polymers obtained possess a glass transition temperature of between 149 and 186° C.

SUMMARY OF THE INVENTION

It was the object of the present invention to provide a prepolymer based on phenolic resins that is distinguished by high solubility in ketones and by a melting point of below 100° C. The prepolymer ought more particularly to be suitable for producing materials having a glass transition temperature, $T_g$, in the range from 140 to 200° C.

It is another object of the invention to provide a process for preparing a prepolymer that includes combining a phenolic resin, an oxazoline component and an epoxide.

It is a further object of the invention to provide a process that includes combining a phenolic resin, an oxazoline component and an epoxide in the presence of a catalyst in an extruder.

It is a further embodiment of the invention to provide a process for preparing a prepolymer that includes combining a phenolic resin, an oxazoline component, an epoxide and a catalyst component as separate streams to an extruder.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein:

FIG. 1 shows a multi-barrel extruder having different feed points for different reactant streams.

DETAILED DESCRIPTION OF PREFERRED EMBODIMENTS OF THE INVENTION

Surprisingly a continuous process has been found which allows the preparation of a prepolymer from an oxazoline component, phenolic resins, epoxides and a catalyst. Owing to the catalyst used, the prepolymer can be prepared at lower curing temperatures and/or the cure time can be shortened as compared with prior-art processes. The resultant polymers are distinguished by a glass transition temperature $T_g$ of 140 to 200° C. In other embodiments of the invention the resultant polymers have glass transition temperatures of from 150 to 190, 160 to 180, and about 170° C. In embodiments of the invention the resultant polymer may have a lower threshold glass transition temperature and/or an upper threshold maximum glass transition temperature corresponding with any of the aforementioned temperature thresholds.

In addition it has been possible to show that the prepolymers of the invention can be prepared continuously by extrusion. Extrusion, surprisingly, yields the possibility of generating prepolymers virtually without preliminary crosslinking, in contrast to the batch processes specified in the prior art. Through the use of an extruder which first ensures intense mixing of the ingredients and secondly allows the starting materials to be metered in separately in terms of time and location, it is possible to avoid almost completely any unwanted premature reactions. The rapid cooling of the prepolymer melt by a chilled belt after exit from the die produces a defined termination of the reaction. Accordingly, a prepolymer is obtained which is notable for very low crosslinking and for its homogeneity, and is therefore very largely soluble in standard commercial solvents, such as ketones, for example. The process of the invention also allows the prepolymer of the invention to have consistent product properties. In a preferable embodiment of the invention the prepolymer melt cools on a chilled belt after exit from a die without emersion or direct contact with liquid water. In other embodiments the prepolymer melt is quenched in a liquid water bath for solidification and cooling after exit from the die.

For the use of the prepolymers as a resin transfer moulding (RTM) system, for processing as a solution, for the coating of glass fibres, for example, or for producing prepregs, it is necessary to have a gel-free material available. The batchwise-prepared material of the prior art neither is soluble in standard commercial solvents nor has a specifiable melting point. In contrast, the prepolymer of the invention is soluble virtually without residue in standard commercial solvents, and can therefore easily be further processed. Moreover, the prepolymers of the invention can be put to uses including the production of structural components for the sectors of electrolaminates, transport and the aircraft industry.

The invention accordingly provides a process for the continuous preparation of prepolymers based on phenolic resin, an oxazoline component and an epoxide in the presence of a catalyst, the process being characterized in that the phenolic resin and the oxazoline component are supplied to the extruder in a stream A, and a Lewis adduct of boron trifluoride or of aluminium trichloride, or arylsulphonic acids or alkylsulphonic acids, or latent arylsulphonic acids or latent alkylsulphonic acids, as catalyst, are supplied to the extruder in a stream B, and the epoxide is supplied to the extruder in a stream C, the infeed of stream A being situated, as seen in extrusion direction, before the infeed of stream C, these reactants are mixed at a reaction temperature of 120 to 200° C., preferably 130 to 190° C., 140 to 180° C., 150 to 170° C. and about 160° C. with a residence time in the extruder of 3 seconds to 15 minutes, preferably from 10 seconds to 10 minutes, 30 seconds to 5 minutes, and about 1 minute and then the product discharge of the extruder is cooled to a temperature of less than 45° C., preferably less than 40°, less than 35°, less than 30°, or a temperature no more than 20° C. above ambient temperature within from 30 to 60 seconds.

Further provided by this invention are a prepolymer obtainable by the process of the invention, and also the use of the prepolymer of the invention.

For the purposes of this invention, prepolymers are understood to be predominantly oligomeric compounds which may also contain small fractions of polymeric compounds. In contrast to polymers, the prepolymers are still soluble and plastically processable and can be converted primarily by thermally initiated reactions into the target polymers. The term "latent arylsulphonic acid" or "latent alkylsulphonic acid" is understood to refer to a mixture of a sulphonic acid and an amino alcohol or an alkylamine.

The process of the invention uses as oxazoline component preferably oxazolines in accordance with the structure (1)

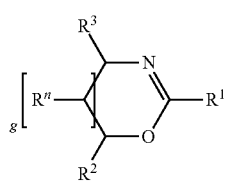

(1)

where
$R^1 = C_{1-2}$ alkyl group or phenyl group,
$R^2$, $R^3$, $R^n$ = hydrogen, $C_{1-2}$ alkyl group,
g = 0, 1, 2, 3, and/or bisoxazolines in accordance with the structure (2)

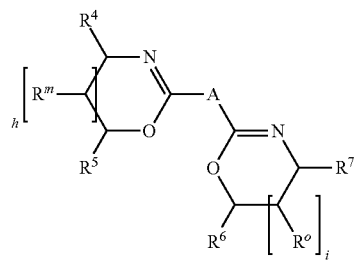

(2)

where
A = methylene or phenylene,
$R^4$, $R^5$, $R^6$, $R^7$, $R^m$, $R^o$ = hydrogen, $C_{1-2}$ alkyl group,
h, i = 0, 1, 2, 3,
it being possible for the substituents of type $R^1$, $R^2$, $R^3$, $R^4$, $R^5$, $R^6$, $R^7$, $R^n$, $R^m$ and $R^o$ to be identical or different and to be substituted or unsubstituted, for the structural fragment A to be substituted or unsubstituted, and for m and o to be identical or different.

The structural fragment A may have a methyl group and/or an ethyl group as substituent. The substituents of type $R^1$, $R^2$, $R^3$, $R^4$, $R^5$, $R^6$, $R^7$, $R^n$, $R^m$ and $R^o$ are preferably unsubstituted.

The process of the invention preferably uses compounds in accordance with the structures (1) and/or (2) which have substituents of type $R^1$, $R^2$, $R^3$, $R^4$, $R^5$, $R^6$, $R^7$, $R^n$, $R^m$ and $R^o$ and also the structural fragment A that are unsubstituted. It is preferred to use compounds in accordance with the structures (1) and/or (2) with g, h, i = 0 or 1.

One preferred embodiment of the process of the invention uses bisoxazolines in accordance with the structure (2) where m and o are preferably 0 or 1. Used more particularly are bisoxazolines in accordance with the structure (2) which as structural fragment A have a phenylene group, such as 1,3-phenylenebisoxazoline or 1,4-phenylenebisoxazoline, for example. In order to tailor the properties of the prepolymer it is also possible to use a mixture of oxazolines and bisoxazolines as oxazoline component.

In the process of the invention it is preferred to use from 10% to 90%, preferably from 30% to 60% and more preferably from 40% to 55% by weight of the oxazoline component, based on the composition of the starting materials.

In the process of the invention it is preferred to use phenolic resins obtained by condensing phenols with aldehydes, more particularly formaldehyde. In this process, accordingly, it is possible to use phenolic resins selected from the novolak type and/or resol type. Particular preference is given to using novolaks as phenolic resin (B). In the process of the invention it is preferred to use from 10% to 90%, preferably from 30% to 60% and more preferably from 40% to 50% by weight of phenolic resin, based on the composition of the starting materials.

As epoxides it is possible in the process of the invention to use monoepoxides in accordance with the structure (3)

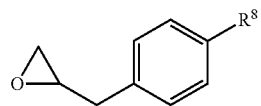

(3)

where $R^8$ = hydrogen, $C_{1-3}$ alkyl group, diepoxides in accordance with the structure (4)

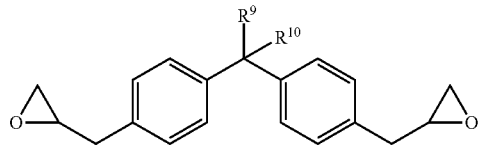

(4)

where $R^9$ and $R^{10}$=hydrogen and $C_{1-3}$ alkyl group, it being possible for $R^9$ and $R^{10}$ to be identical or different, or polyfunctional epoxides in accordance with the structure (5) and/or the structure (6)

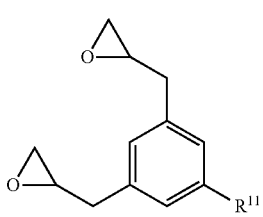

(5)

where $R^{11}$=hydrogen, $C_{1-3}$ alkyl group or

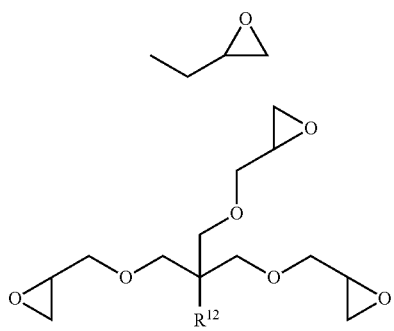

(6)

where $R^{12}$=hydrogen or $C_{1-3}$ alkyl group.

In the process of the invention it is preferred to use mixtures consisting of monoepoxides, diepoxides and/or polyfunctional epoxides as epoxide. The structures (3) to (6) preferably have linear alkyl groups.

In the process of the invention it is preferred to use from 1% to 10%, preferably from 3% to 8% and more preferably from 4% to 6% by weight of epoxide, based on the composition of the starting materials.

In one particular embodiment of the process of the invention it is possible additionally to supply benzoxazines of the structure (7)

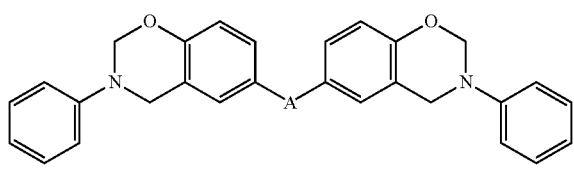

(7)

where $A=(CR^{13}R^{14})$, S
$R^{13}$, $R^{14}$=H, $C_{1-4}$ alkyl group

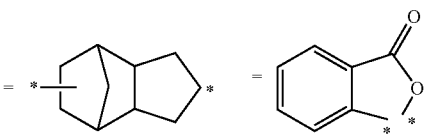

*=linkage point to the extruder as well. In the region of 180-190° C., these compounds undergo rearrangement, thereby providing further phenolic OH groups for the reaction.

In the process of the invention it is preferred to use from 0% to 10%, preferably from 2% to 9% and more preferably from 4% to 8% by weight of benzoxazines, based on the composition of the starting materials. In one particular embodiment of the process of the invention no benzoxazine is used.

As catalysts in the process of the invention it is preferred to use Lewis adducts of boron trifluoride, or latent arylsulphonic acids, more particularly boron trifluoride-ethylamine adduct, boron trifluoride-methanol adduct, boron trifluoride-phosphoric acid, p-toluenesulphonic acid/diethanolamine or p-toluenesulphonic acid/1-amino-2-propanol. The Lewis adducts of boron trifluoride give off $BF_3$ at elevated temperatures. Using $BF_3$ directly in the process of the invention is not advisable, owing to the gaseous state and its toxicity. As an alternative it is also possible to use $AlCl_3$ adducts.

For the purposes of the present invention, the latent sulphonic acids are adducts of sulphonic acids and donor compounds. More particularly the donor compounds are amino alcohols or alkylamines having 1 to 4 carbon atoms. With particular preference the latent sulphonic acid is an equimolar mixture of the sulphonic acid and an amino alcohol or alkylamine, preferably amino alcohol. Without being tied to one theory, it is assumed that in the case of the latent sulphonic acids the catalytically active sulphonic acids are liberated at elevated temperatures.

The catalyst in the process of the invention is used preferably in an amount of 0.2% to 5%, preferably of 0.4% to 4% and more preferably of 0.5% to 3% by weight, based on the composition of the starting materials.

It is advantageous to supply the Lewis adduct catalyst in the form of a solution to the extruder. The catalyst is used preferably as an alcoholic solution, more preferably as an ethanolic solution, in the process of the invention. The amount of the catalyst in the alcohol is preferably from 30% to 50% by weight. When using arylsulphonic acids or alkylsulphonic acids as catalyst, alone or as latent sulphonic acid, it is advantageous to meter them as a melt into the extruder.

In the process of the invention, as well as the catalyst, it is also possible to add antioxidants, this being done preferably in one of the infeeds of the starting materials into the extruder. As antioxidants it is preferred to use what are called sterically hindered phenols, these being preferably compounds in accordance with the structure (8),

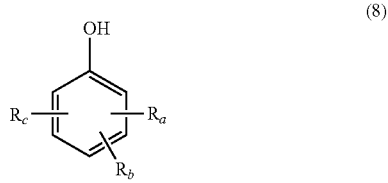

(8)

where $R_a$, $R_b$, $R_c$=hydrogen, alkyl group, alkylaryl group or cycloalkyl group, it being possible for the substituents of type $R_a$, $R_b$, $R_c$ to be identical or different and substituted or unsubstituted, such as, for example, the reaction product of 4-methylphenol with dicyclopentadiene and isobutene in accordance with structure (9),

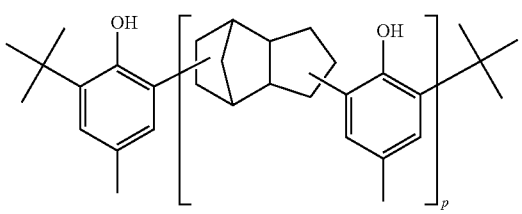

(9)

where p=1 to 5.

The antioxidants are used preferably in an amount of 0.1% to 2%, preferably of 0.2% to 1.5% and more preferably of 0.2% to 1.2% by weight, based on the composition of the starting materials, in the process of the invention. Examples of antioxidants which can be used are RALOX® LC or IONOL® LC.

In the process of the invention it is also possible, furthermore, to use stabilizers, preference being given to use of what are called HALS compounds (Hindered Amine Light Stabilizers)—derivatives of 2,2,6,6-tetramethylpiperidin-4-one. Also possible is the addition of a mixture of different HALS compounds. The addition of stabilizers allows improvement to be obtained in the long-term stability of the resultant polymer.

In the process of the invention it is preferred to use stabilizers in accordance with the structure (10)

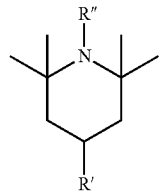

(10)

where R'=alkoxy group,

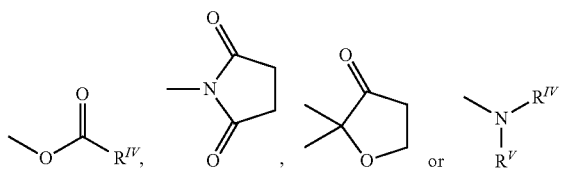

and

R''=oxygen radical (—O'*), hydrogen, alkyl group or alkoxy group,

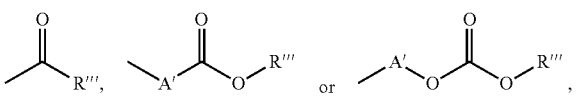

where R''' and $R^{IV}$=alkyl group, $R^V$=heterocycle and A'=alkylene group, and where the alkyl, alkoxy and alkylene groups and heterocycles are substituted or unsubstituted.

In the process of the invention it is particularly preferred to use stabilizers in accordance with the structures (11) to (13) below:

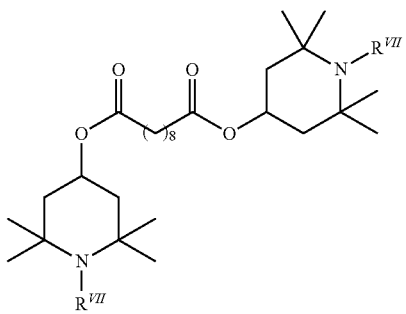

(11)

where $R^{VII}$=hydrogen, alkyl group or alkoxy group,

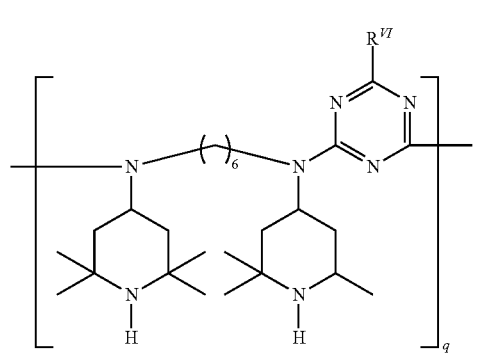

(12)

where $R^{VI}$=

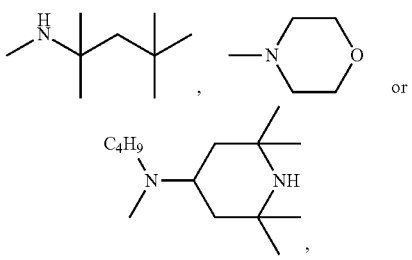

q=2 to 10, or

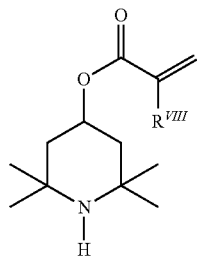

(13)

where $R^{VIII}$=hydrogen or alkyl group.

A further embodiment of the process of the invention uses what are called polymer-bound HALS compounds, such as, for example, compounds in accordance with the structure (14)

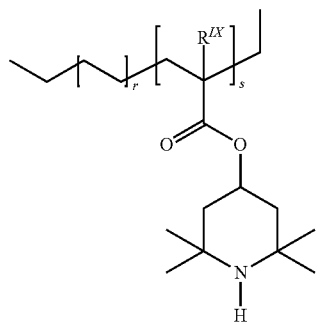

(14)

where $R^{IX}$=hydrogen or alkyl group and r, s≥10.

These polymer-bound HALS compounds are 2,2,6,6-tetramethylpiperidin-4-one derivatives which are bound on or in a polymer chain.

In particular, the stabilizers are used in an amount of 0.1% to 2%, preferably of 0.2% to 1.5% and more preferably of 0.3% to 1.2% by weight, based on the composition of the starting materials, in the process of the invention.

In the process of the invention it is preferred to admix not only sterically hindered phenols but also HALS compounds to the starting materials.

In a further embodiment of the process of the invention, the stabilizers and/or the antioxidants can be admixed to the prepolymer subsequently in a downstream assembly.

In the process of the invention it is advantageous to add additives such as, for example, devolatilizers, defoamers or what are called flow control additives to the starting materials. As additives it is possible to use, for example silicone oils or silicone-modified polyglycols and polyethers, foam-destroying polysiloxanes or polymers, polyether-modified polymethylalkylsiloxanes, of the kind sold, for example, by BYK under the trade names BYK®-A 506, BYK®-A 525, BYK®-A 530, BYK-054, BYK®-R 605, BYK®-R 606 or BYK®-A 535. The addition of these additives has the advantage that formation of bubbles in the prepolymer and in the subsequent material can be significantly reduced. The additives, or else mixtures of two or more of these additives, are added preferably in amounts of 0.1% to 1%, more preferably of 0.2% to 0.8% and very preferably of 0.3% to 0.7% by weight, based on the composition of the starting materials.

Additionally it is possible to add both halogenated and unhalogenated flame retardants to the prepolymer; in the process of the invention it is preferred to use from 1% to 10% by weight of the flame retardant, based on the composition of the starting materials.

When a solution of the prepolymer of the invention is used it is advisable to add flow control agents, wetting agents, devolatilizers, further solvents and inorganic additives, such as precipitated silicas, for example, in order to bring about improvement in criteria including instances of surface sticking, the levelling scenario, and the flame resistance as well. Accordingly, in the process of the invention, it is preferred to use from 0.5% to 5%, more preferably from 2% to 4% by weight, of a precipitated silica, based on the composition of the starting materials, the silica being of the kind sold, for example, under the trade name SIPERNAT® 50.

Other additives may come from the area of the impact modifiers; accordingly it is possible to use, for example from 1% to 15% by weight of an impact modifier, based on the composition of the starting materials, in the process of the invention.

It is advantageous, furthermore, to use at least one release agent in the process of the invention. This allows the management of the polymer composition in shaping processes to be improved. In the process of the invention it is preferred to use release agents selected from silicones, in the form for example of oils, oil emulsions in water, fats and resins,
  waxes, examples being natural and synthetic paraffins with and without functional groups,
  metal soaps or metal salts of fatty acids, such as calcium, lead, magnesium, aluminium and/or zinc stearate, for example,
  greases,
  polymers, examples being polyvinyl alcohols, polyesters and polyolefins,
  phosphoric monoesters,
  fluorinated hydrocarbons and/or
  inorganic release agents, such as powdered graphite, talc and mica, for example.

As a release agent the prepolymer prepared by means of the process of the invention preferably comprises internal release agent systems which are added to the starting materials in the process of the invention and which accumulate primarily during the shaping operation either on the surface of the moulding or are able to bring about more rapid curing of the surface, thereby preventing any association between mould wall and moulding. In the process of the invention use is made more particularly of release agents from the company Acmos Chemie KG that are sold under the trade names ACMOSAL® 82-837, ACMOSAL® 82-847, ACMOSAL® 82-860, ACMOSAL® 82-866, ACMOSAL® 82-9018 and ACMOSAL® 82-853. In the process of the invention the release agent is used more preferably in an amount of 0.1% to 2% by weight, very preferably of 0.2% to 1.5% by weight, based on the composition of the starting materials.

In the process it is also possible, furthermore, to use wetting agents, preferably surfactants, more preferably ethoxylated fatty alcohols or sodium lauryl sulphate, preferably in an amount of 0.1% to 2% by weight, based on the composition of the starting materials.

The intense mixing of the starting materials in the process of the invention is accomplished in an extruder with supply of heat. Intense mixing and brief reaction with supply of heat means that the residence time of the starting materials in the extruder is typically 3 seconds to 15 minutes, preferably 3 seconds to 5 minutes, more preferably 5 to 180 seconds and very preferably from 30 to 90 seconds. In the course of this time the starting materials are mixed briefly but intensely with supply of heat and possibly brought partially to reaction. Depending on the nature of the starting materials and of the end products, these figures for residence time and temperature may vary.

Since the aim of the process of the invention is to prepare a prepolymer, it is preferred that only a conversion of not more than 5%, based on the oxazoline used, is achieved with the selected temperatures, residence times and supplying of the streams. In one particularly preferred embodiment of the process of the invention there is no conversion.

Apparatus such as single-screw or multiple-screw extruders, more particular twin-screw extruders, planetary roller extruders or annular extruders are particularly suitable extruders for the process of the invention and are used with preference. In one particular embodiment of the process of the invention it is also possible to use multiple-shaft extruders, such as annular extruders, for example. Particular preference is given to using multiple-screw extruders, more particularly twin-screw extruders, and multiple-shaft extruders, more particularly annular extruders. Twin-screw extruders are especially preferred.

The starting materials are metered into the extruder preferably in separate streams, in order to avoid premature curing of the prepolymer. Accordingly, the use of a multi-barrel extruder is preferred. A multi-barrel extruder for the purposes of this invention means an extruder whose barrel casing around the screw or screws is divided into different zones, which in turn can be separately heated or cooled. In these different zones, referred to as the barrels, it is also possible to supply streams separately from one another. In this way, the streams can be fed in specifically at different locations on the extruder, and the composition of the individual streams can differ.

FIG. 1 describes schematically one exemplary construction of such a multi-barrel extruder:
(a) metered feed of stream A
(b) metered feed of stream B
(c) product discharge location (measurement location for the exit temperature)
(d) cooling belt
(e) comminutor
(f) granules
(g) barrel casing divided into eight different zones, known as the barrels
(h) screw drive
(i) head of the extruder (measurement location for the head temperature)
(k) metered feed of stream C The different barrels of the extruder in the process of the invention preferably have different temperatures. The barrel or barrels directly adjacent to the screw drive preferably has or have a temperature below the reaction temperature (temperature zone TZ1), more preferably of 30 to 100° C., even more preferably 40 to 90° C., 50 to 80° C., or 60 to 70° C. The barrel or barrels ahead of the product discharge location also has or have a temperature below the reaction temperature (temperature zone TZ3), more preferably of 100 to 160° C., preferably 110 to 150° C., 120 to 140° C. or about 130° C. The centrally located barrels of the extruder have the desired reaction temperature (temperature zone TZ2), which in the case of the process of the invention is from 160 to 200° C., preferably from 170 to 190° C. and more preferably from 175 to 185° C.

In the context of this invention, the term "reaction temperature" is not synonymous with a reaction featuring significant conversion; instead, in the process of the invention, the aim is for a maximum conversion of 5%, or maximum conversion of 1% but preferably no conversion.

In the process of the invention it is preferred to supply the phenolic resin and the oxazoline component to the extruder in one stream A, the metered feed taking place preferably into an extruder barrel with the temperature zone TZ1 and more preferably into the first barrel directly adjacent to the screw drive.

It is very advantageous to supply the epoxides and the catalyst to the extruder in a separate stream B or in a stream C, the streams B and C preferably being supplied into a centrally located barrel of the temperature zone TZ2 or into a barrel ahead of the product discharge location of the temperature zone TZ3. The feed takes place preferably into the barrel of the temperature zone TZ2 that is the closest to the product discharge location. The two streams B and C are more preferably supplied separately to the extruder, this being especially advantageous when the catalyst is supplied in the form of a solution to the extruder.

In one particular embodiment of the process of the invention, stream B, provided that the catalyst is in the form of a solid and not a solution, can be supplied to stream A ahead of the extruder, so that streams A and B are supplied jointly to the extruder. The joint metered feed of the two streams A and B takes place preferably in the temperature zone TZ1, and with particular preference the joint metered feed takes place into the first barrel directly adjacent to the screw drive.

The possible additives, such as defoamers, devolatilizers, stabilizers or antioxidants, for example, are supplied to the extruder preferably in stream A. It is also possible, however, to supply the additives at another feed port separately to the two streams A and B to one of the barrels of the extruder.

The subsequent cooling is preferably carried out rapidly and can be integrated in the extruder. In addition, however, it is possible to use tube bundles, pipe coils, chill rolls, air conveyors and metal conveyor belts downstream of the extruder.

Converting takes place, depending on the viscosity of the prepolymer leaving the extruder, initially by further cooling to a suitable temperature, by means of corresponding aforementioned apparatuses. It is followed by pelletizing or else by comminution to a desired particle size by means of a roll crusher, pinned-disc mill, hammer mill, flaking rolls or the like.

A feature of the prepolymer obtainable by means of the process of the invention is that it is soluble to form a clear solution preferably in ketones, more preferably in 2-butanone, provided that no solids have been used, such as precipitated silicas, for example, as additives in the process of the invention. Furthermore, the prepolymer of the invention preferably has a melting range of 60 to 120° C., preferably of 77 to 116° C.

These properties of the prepolymer of the invention distinguish it from the prior-art prepolymers, which are not soluble in 2-butanone. Furthermore, no melting point can be determined for the products of the prior art, since they generally decompose beforehand.

The properties of the prepolymer of the invention also point to a much lower crosslinking in contrast to products of prior-art processes. The prepolymer of the invention can therefore be applied in the form of a solution, in a ketone, for example, such as 2-butanone, to a support material, such as glass fibre or carbon fibre, for example. Application of the prepolymer by means of powder technology is also possible since the prepolymer of the invention has a melting point and can therefore be melted without decomposition.

Further provided by this invention is the use of the prepolymer of the invention for producing materials, more particularly composite materials, more preferably fibre composite materials. Besides its use for producing composite materials, the prepolymer of the invention may also be employed for producing plastics. These produced plastics preferably have a glass transition temperature, $T_g$, of 140 to 200° C. and more preferably of 175 to 190° C., and these materials are preferably formaldehyde-free.

Depending on the type of use, the prepolymer of the invention may first be dissolved in standard commercial solvent, more particularly ketones, preferably in 2-butanone.

In the inventive use of the above-described prepolymer it is possible to use inorganic reinforcing fibres, such as glass fibres for example, organic reinforcing fibres, such as aramid fibres, for example, or carbon fibres, metallic reinforcing fibres or natural fibres. The reinforcing fibres in these cases may be used in the form of woven fabrics, laid scrims, multiaxial scrims, nonwovens, knits, braids or mats.

The prepolymer of the invention is preferably first dissolved in a ketone, more preferably in 2-butanone, and then reinforcing fibres, preferably glass fibres or carbon fibres, are impregnated with the solution of the prepolymer of the invention, and, finally, curing is carried out.

In the context of its inventive application, the prepolymer described above is used as a matrix. Hence this prepolymer may be used, for example, for producing preimpregnated intermediates, such as sheet moulding compound (SMC) or bulk moulding compound (BMC), for example. Pre-forming may likewise be used for producing the intermediate product in the inventive use.

The processing of this prepolymer with reinforcing materials to form composite materials may be accomplished by a multiplicity of processes/technologies. More particularly the composite material is produced by one of the technologies listed below:

lamination, including manual lamination,
prepreg technology,
resin transfer moulding (RTM),
infusion processes, such as resin infusion moulding (RIM) or the Seeman Composites Resin Infusion Process (SCRIMP), for example,
winding processes,
pultrusion processes or
fibre laying processes.

In the inventive use this prepolymer can be cured by means of supply of temperature, in an oven, in an autoclave or in a press, for example, or else using microwaves.

The composite materials produced by means of the inventive use may be employed especially in the sectors of the air travel industry, transport, such as the automotive industry, for example, and the electrical industry. These composite materials may also be employed in windpower plants, pipes or containers in the form of tanks or pressure vessels.

The prepolymer can also be used for producing lightweight structures, especially in combination with multi-layer constructions, such as honeycombs or foams based on phenolic resin, polyimide, glass, polyurethane, polyamide or polyvinyl chloride, for example.

Using the prepolymer in materials results in particular in components having a high heat distortion resistance, a high glass transition temperature $T_g$. Also advantageous is the high toughness and resilience of this prepolymer, resulting in improved impact properties. Further fields of application for the prepolymer or for the materials resulting from it are, for example, abrasives, refractory products, in the foundry industry, for battery separators, in compression and injection mouldings, in mineral wool (composed inter alia of glass, rock or basalt (formaldehyde-free)), for paper impregnation, in laminates based on glass or paper for electrical insulation, for producing foams, in the coating of glass or metal, for example as cable protection, in rubber mixtures as a substitute for novolak, as a separate phase, and as a co-reactant with other thermosets, such as bismaleimide, for example.

The prepolymer of the invention can be used with preference for producing prepregs. For the purposes of this invention, prepregs (a shortened form of preimpregnated fibres) refer to an intermediate product composed of continuous fibres and an uncured matrix consisting of the prepolymer of the invention. Continuous fibres which can be used for such products include glass fibres, carbon fibres and aramid fibres. The prepolymer of the invention is used preferably as a powder for producing these prepregs.

The examples which follow are intended to elucidate the process of the invention in more detail, without any intention that the invention should be confined to this embodiment.

Examples

Comparative Examples 1 to 3

14.30 g of 1,3-phenylenebisoxazoline, 13.91 g of phenolic resin (DUREZ® 33100 from Sumitomo-Bakelite), 1.50 g of epoxides (ARALDITE® 506 epoxy resin from Aldrich) and 0.30 g of the catalyst were mixed at 160° C. and at 50 rpm in a Brabender W 30 kneading chamber. In order to prevent the product being squeezed out of the barrel, the ram of the kneading apparatus was weighted via a lever with a 1 kg weight. After just a few minutes, the mixture can no longer be kneaded, and so the mixing operation was discontinued. The catalysts used and the results are summarized in Table 1.

TABLE 1

| Example | Catalyst | Kneading time | Melting point or decomposition temperature |
| --- | --- | --- | --- |
| 1 | boron trifluoride-ethylamine adduct | 10 minutes | >300° C. |
| 2 | boron trifluoride-methanol adduct | 4 minutes | >300° C. |
| 3 | boron trifluoride-phosphoric acid adduct | 7 minutes | >300° C. |

Conventional mixing of the components in a kneading chamber results in a cured product whose melting point or decomposition temperature is above 300° C. and therefore disqualifies it as a prepolymer.

Comparative Examples 4 to 5

14.30 g of 1,3-phenylenebisoxazoline and 13.90 g of phenolic resin (DUREZ® 33100 from Sumitomo-Bakelite) were melted at a bath temperature of 160° C. in a glass beaker for about 30 minutes; subsequently, with stirring, 1.50 g of epoxides (ARALDITE® 506 epoxy resin from Aldrich) and 0.30 g of the catalyst were added. A few minutes after the addition of the catalyst, the mixture can no longer be stirred. The catalysts used and the results are summarized in Table 2.

TABLE 2

| Example | Catalyst | Stirring time after catalyst added | Melting point or decomposition temperature |
|---|---|---|---|
| 4 | boron trifluoride-ethylamine adduct | 1 minute | >300° C. |
| 5 | boron trifluoride-methanol adduct | 2 minutes | >300° C. |

Even the late addition of the epoxide and of the catalyst to the mixture results in a cured product whose melting point or decomposition temperature is above 300° C. and therefore disqualifies it as a prepolymer.

Comparative Example 6

14.30 g of 1,3-phenylenebisoxazoline and 13.90 g of phenolic resin (DUREZ® 33100 from Sumitomo-Bakelite) were melted at a bath temperature of 160° C. in a glass beaker for about 30 minutes; subsequently, with stirring, 1.50 g of epoxides (ARALDITE® 506 epoxy resin from Aldrich) and 0.30 g of triphenyl phosphite as catalyst were added. The starting materials were stirred for a further 5 minutes and then the melt was cooled to room temperature. The melting range of the prepolymer was from 85.5 to 101° C. and the glass transition temperature $T_g$ was 137° C., with curing being carried out at a temperature of 180° C. for 6 hours.

Using triphenyl phosphite as the catalyst results in a prepolymer which leads to a material having a glass transition temperature $T_g$ of only 137° C.

Inventive Examples 7 to 10

Examples 7 to 10 were carried out in a DSE 25 twin-screw extruder from Brabender, consisting of eight barrels, which were heated and cooled separately (see FIG. 1).

The temperatures of the extruder barrels are set as follows:

barrel 0: 35 to 45° C.

barrel 1: 86 to 100° C.

barrels 2 to 5: 180° C.

barrel 6: 120 to 160° C.

barrel 7: 100 to 110° C.

head temperature: 100 to 160° C.

exit temperature: 148 to 154° C.

All of the solid components (phenolic resin, oxazoline, stabilizer, antioxidant, flame retardants where used)—except for the epoxide and the catalyst—were premixed mechanically and conveyed into barrel 0 of the extruder via a metering hopper (see (a) in FIG. 1). Metered in parallel are the epoxide (reservoir vessel with jacket temperature of 100° C., see (k) in FIG. 1) and the catalyst solution, from two different reservoir containers, into barrel 5 (see (b) in FIG. 1). The catalyst was conveyed as a solution with a strength of 20% to 44% by weight into the melt. The throughput of the extrudate is about 6 kg/h. The melt was taken off via a water-cooled belt (see (d) in FIG. 1), comminuted and ground (see (e) in FIG. 1).

The starting materials and their amounts are shown in Table 3.

TABLE 3

| | Example | | | |
|---|---|---|---|---|
| | 7 | 8 | 9 | 10 |
| Component | Amount in the composition of the starting materials (in % by weight) | | | |
| Phenolic resin [1] | 46.02 | 45.53 | 45.10 | 43.72 |
| Oxazoline [2] | 47.33 | 46.83 | 46.38 | 44.96 |
| Epoxide [3] | 5.00 | 4.95 | 4.90 | 4.75 |
| Catalyst [4] | 0.95 | 2.00 | 0.93 | 0.90 |
| Stabilizer [5] | 0.47 | 0.46 | 0.46 | 0.45 |
| Antioxidant [6] | 0.23 | 0.23 | 0.23 | 0.22 |
| Flame retardant [7] | 0.00 | 0.00 | 2.00 | 5.00 |

[1] DUREZ ® 33100 from Sumitomo-Bakelite
[2] 1,3-Phenylenebisoxazoline
[3] EPILOX ® 18-00 from LEUNA-Harze GmbH
[4] Boron trifluoride-ethylamine adduct as 44% strength by weight solution in ethanol
[5] CYASORB ® 3346 from Cytec
[6] RALOX ® LC from Raschig.
[7] CLOISITE ® 30B from Southern Clay Products, Inc.

The extruder discharges were analyzed at regular time intervals:

The melting point of the extruder discharges obtained was determined by means of the method of Tottoli (CH 320388).

Furthermore, a 50% strength by weight solution of the extruder discharge in 2-butanone was prepared, and the weight fraction of the insolubles is ascertained.

The determination of the glass transition temperature $T_g$ takes place by means of differential scanning calorimetry (DSC). The extruder discharge was heated from 25° C. to 180° C. at a heating rate of 10 K/min, annealed or cured in an aluminium boat at 180° C. for 6 hours, cooled to 25° C. with a cooling rate of 10 K/min, and then its glass transition temperature $T_g$ was determined with a heating rate of 10 K/min to 300° C. in accordance with DIN 73765.

The properties of the products from the comparative examples were likewise determined using these analytical techniques.

The results of the analyses on the extruder discharges from Examples 7 to 10 are set out in Table 4:

TABLE 4

| Example | Melting point (in ° C.) | Solution behaviour | Glass transition temperature (in ° C.) |
|---|---|---|---|
| 7 | 77-96 | clear solution | 187 |
| 8 | 78-92 | clear solution | 181 |
| 9 | 84-116 | brownish solution with solids fraction | not determined |
| 10 | 79-94 | not determined | not determined |

The solids fraction observed in Example 9 is the flame retardant, which is present in solid form and therefore not soluble in 2-butanone; the behaviour in the case of Example 10 is similar.

The inventive examples show that on the basis of the process of the invention it is possible to produce a prepolymer, by means of a Lewis adduct of boron trifluoride, that meets the requirement of solubility in a ketone. These examples show more particularly that this prepolymer has a melting point of less than 120° C. The materials which can be produced from the prepolymer have a glass transition temperature $T_g$ of 181 to 187° C.

Inventive Example 11

All of the solids (phenolic resin, oxazoline, stabilizer, antioxidant) were mixed mechanically and conveyed into the extruder via a metering hopper (see (a) in FIG. 1) with parallel metering of catalyst (see (b) in FIG. 1) and of a mixture consisting of epoxide and impact modifier (reservoir vessel has jacket temperature 50° C., see (k) in FIG. 1). The mixture was produced by heating the impact modifier to 60° C. in a drying cabinet and homogenizing it with the epoxide, using a propeller stirrer. The catalyst was conveyed in the form of a 40% strength by weight solution into the melt. The throughput of the extrudate is about 6 kg/h. The melt was taken off via a water-cooled belt, comminuted and ground.

TABLE 5

Composition of the polymer melt

| Component | Amount (in % by weight) |
|---|---|
| Phenolic resin [1] | 41.41 |
| Oxazoline [2] | 42.60 |
| Antioxidant [6] | 0.21 |
| Stabilizer [5] | 0.42 |
| Catalyst [4a] | 0.86 |
| Epoxide [3] | 4.50 |
| Impact modifier [8] | 10.00 |

[4a] Boron trifluoride-ethylamine adduct as 40% solution in ethanol
[8] HYPRO CTBN 1300 x13

The melting range of the prepolymer is 68 to 86° C.

Inventive Example 12

25.39 g of 1,3-phenylenebisoxazoline, 20.76 g of phenolic resin (Durez® 32311 from Sumitomo-Bakelite), 0.11 g of antioxidant (IONOL LC® from Raschig) and 0.23 g of stabilizer (Cyasorb® 3346 from Cytec) were melted at 140° C. in a glass beaker in approximately 30 minutes and stirred for approximately 5 minutes. After the melt had been cooled to room temperature it was homogenized by mortars, melted at 100° C. in a glass beaker in approximately 30 minutes and admixed with stirring with 2.50 g of epoxide (Epilox® P13-20 from Leuna Harze) and 1.0 g of latent catalyst (prepared from equimolar amounts of p-toluenesulphonic acid monohydrate (from Merck) and diethanolamine (from Merck), corresponding to 0.64 g=1.28% of p-toluenesulphonic acid monohydrate).

The starting materials were stirred for a further 5 minutes and then the melt was cooled to room temperature. The glass transition temperature $T_g$ after curing was 121° C., with curing being carried out at a temperature of 180° C. for 6 hours.

The glass transition temperatures $T_g$ were determined by means of differential scanning calorimetry (DSC) with a heating rate of 10 K/min to 300° C. in accordance with DIN 73765.

The use of latent p-toluenesulphonic acid monohydrate/diethanolamine (1.28% p-toluenesulphonic acid monohydrate) results in a prepolymer which leads to a material having a glass transition temperature $T_g$ of 121° C.

Inventive Example 13

25.68 g of 1,3-phenylenebisoxazoline, 21.00 g of phenolic resin (Durez® 32311 from Sumitomo-Bakelite), 0.11 g of antioxidant (IONOL LC® from Raschig) and 0.23 g of stabilizer (Cyasorb® 3346 from Cytec) were melted at 140° C. in a glass beaker in approximately 30 minutes and stirred for approximately 5 minutes. After the melt had cooled to room temperature it was homogenized by mortars, melted at 100° C. in a glass beaker in approximately 30 minutes and admixed with stirring with 2.50 g of epoxide (Epilox® P13-20 from Leuna Harze) and 0.48 g of latent catalyst (prepared from equimolar amounts of p-toluenesulphonic acid monohydrate (from Merck) and diethanolamine (from Merck), corresponding to 0.31 g=0.61% of p-toluenesulphonic acid monohydrate).

The starting materials were stirred for a further 5 minutes and then the melt was cooled to room temperature. The glass transition temperature $T_g$ after curing was 93.6° C., with curing being carried out at a temperature of 180° C. for 6 hours.

The glass transition temperatures $T_g$ are determined by means of differential scanning calorimetry (DSC) with a heating rate of 10 K/min to 300° C. in accordance with DIN 73765.

The use of latent p-toluenesulphonic acid monohydrate/diethanolamine (0.61% p-toluenesulphonic acid monohydrate) results in a prepolymer which leads to a material having a glass transition temperature $T_g$ of 93.6° C.

Inventive Example 14

25.39 g of 1,3-phenylenebisoxazoline, 20.76 g of phenolic resin (Durez® 32311 from Sumitomo-Bakelite), 0.11 g of antioxidant (IONOL LC® from Raschig) and 0.23 g of stabilizer (Cyasorb® 3346 from Cytec) were melted at 140° C. in a glass beaker in approximately 30 minutes and stirred for approximately 5 minutes. After the melt had cooled to room temperature it was homogenized by mortars, melted at 100° C. in a glass beaker in approximately 30 minutes and admixed with stirring with 2.50 g of epoxide (Epilox® P13-20 from Leuna Harze) and 1.4 g of latent catalyst (prepared from equimolar amounts of p-toluenesulphonic acid monohydrate (from Merck) and 1-amino-2-propanol (from Merck), corresponding to 1.0 g=2% of p-toluenesulphonic acid monohydrate).

The starting materials were stirred for a further 2 minutes, 5.55 g of Exolit AP 422 (flame retardant) are added and then the melt was cooled to room temperature. The glass transition temperature $T_g$ after curing was 113° C., with curing being carried out at a temperature of 140° C. for 3 hours. This was followed by an aftercure at 180° C. for two hours, leading to a glass transition temperature of 144° C.

The glass transition temperatures $T_g$ were determined by means of differential scanning calorimetry (DSC) with a heating rate of 10 K/min to 300° C. in accordance with DIN 73765.

The invention claimed is:

1. A process for the continuous preparation of a prepolymer composition wherein the prepolymers are based on a phenolic resin component, an oxazoline component and an epoxide component, comprising:
   combining the phenolic resin component, the oxazoline component and the epoxide component, in the presence of a catalyst, in an extruder,
   wherein the phenolic resin component and the oxazoline component are supplied to the extruder in a stream A, and
   at least one catalyst selected from the group consisting of a Lewis adduct of boron trifluoride, a Lewis acid adduct of aluminium trichloride, an arylsulphonic acid, an alkylsulphonic acid, a latent arylsulphonic acid, and a latent alkylsulphonic acid, as catalyst, are supplied to the extruder as stream B, and the epoxide component is supplied to the extruder in a stream C, wherein an infeed of the stream A, relative to an extrusion direction, is before an infeed of the stream C, wherein the streams A, B and C are combined at a reaction temperature of 120 to 200° C. with a residence time in the extruder of 3 seconds to 15 minutes to form a product, and then the product is discharged from the extruder and cooled to a temperature of less than 45° C. within from 30 to 60 seconds.

2. The process according to claim 1, wherein the extruder is a multi-barrel extruder.

3. The process according to claim 2, wherein the barrels of the multi-barrel extruder are at different temperatures during the combining.

4. The process according to claim 3, wherein the multi-barrel extruder comprises a first barrel for the stream A, a second barrel subsequent to the first barrel, in an extrusion direction, one or more additional barrels subsequent to the second barrel, and a third barrel subsequent to the additional barrels and before a product discharge location, wherein the first barrel, the second barrel and the third barrel have a temperature below the temperature in the additional barrels in which the streams A, B and C are combined.

5. The process according to claim 4, comprising supplying the streams B and C in a fourth barrel which is located, in an extrusion direction, between the first barrel in which the stream A is supplied and the product discharge location at which the product is discharged.

6. The process according to claim 4, wherein streams A and B are supplied together into the extruder.

7. The process according to claim 1, wherein the epoxide component comprises at least one of:

a monoepoxide of the structure

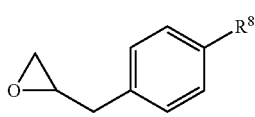

(3)

where $R^8$=hydrogen, $C_{1-3}$ alkyl group,
a diepoxide of the structure (4)

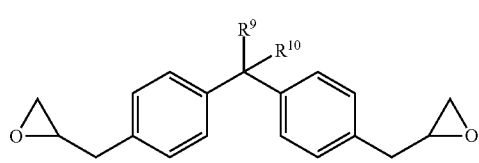

(4)

where $R^9$ and $R^{10}$=hydrogen and $C_{1-3}$ alkyl group, it being possible for $R^9$ and $R^{10}$ to be identical or different, a polyfunctional epoxide of the structure (5), and a polyepoxide of structure (6)

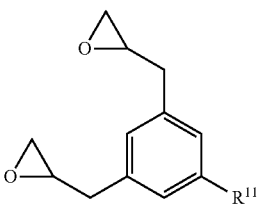

(5)

where $R^{11}$=hydrogen, $C_{1-3}$ alkyl group or

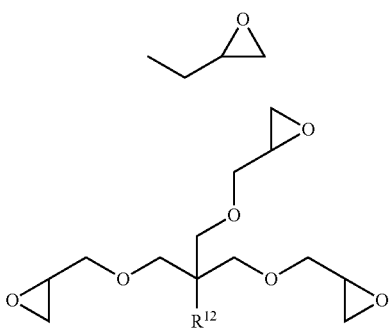

(6)

where $R^{12}$=hydrogen or $C_{1-3}$ alkyl group.

8. The process according to claim 1, wherein the total amount of the epoxide component combined with the oxazoline component and the phenolic resin component is from 1 to 10% by weight based on the total weight of components supplied to the extruder.

9. The process according to claim 1, further comprising:
supplying one or more hindered amine light stabilizers to the extruder.

10. The process according to claim 1, further comprising:
supplying one or more sterically hindered phenolic antioxidants to the extruder.

11. The process according to claim 1, further comprising:
supplying from 1% to 15% by weight of at least one impact modifier to the extruder based on the total weight of the streams supplied to the extruder.

12. The process according to claim 1, further comprising:
supplying from 1% to 10% by weight of at least one of a halogenated flame retardant and a nonhalogenated flame retardant is supplied to the extruder based on the total weight of the streams supplied to the extruder.

13. A prepolymer obtained by the process according to claim 1.

14. A composition comprising the prepolymer of claim 13.

15. A powder for producing prepregs, comprising: the prepolymer of claim 13 and one or more additional components.

16. A process comprising:
dissolving the prepolymer of claim 13 in 2-butanone and impregnating at least one reinforcing fiber selected from the group consisting of a glass fibre and a carbon fibre with the dissolved prepolymer, and
curing the impregnated reinforcing fiber.

* * * * *